United States Patent Office 3,523,442
Patented Aug. 11, 1970

3,523,442
METHOD OF PRODUCING THE METAL OBJECTS OF VARIABLE THICKNESS AND A DEVICE FOR APPLICATION OF THIS METHOD
Zdzislaw Marciniak, Szczesliwicka 1/5 m. 45, Warsaw, Poland
Filed Jan. 22, 1968, Ser. No. 699,698
Claims priority, application Poland, Jan. 20, 1967, P 118,606
Int. Cl. B21j 7/20
U.S. Cl. 72—406    4 Claims

ABSTRACT OF THE DISCLOSURE

A method and apparatus for producing disk-like objects of non-uniform thickness by compressing moldable material between a fixed die and a movable die, the latter of which moves axially and performs additional motions resulting from a combination of at least two component motions each of which individually would cause the axis of the movable die to describe a conicord having a constant vertex angle. The additional motions may have the same or different speeds.

---

Figure 1:
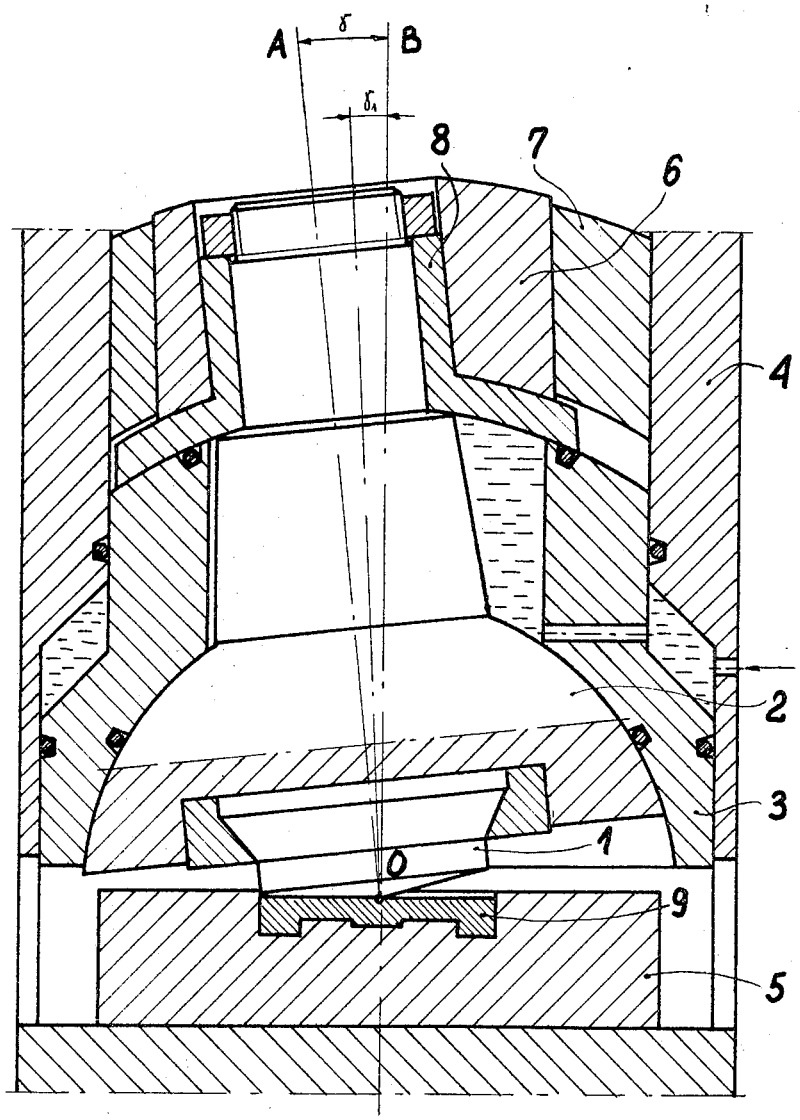

The present invention concerns a method and apparatus of producing metal objects of small thickness, in comparison with their transverse dimensions, having for instance the shape of plates, disks or rings of variable thickness.

One of the known methods of plastic forming such objects is the subject of Polish Pat. No. 51,954 and consists in compressing the metal between two dies, one of which performs additional motions in relation to the other die. The motions are of such kind that the axis of symmetry of the die, perpendicular to the shaping surface, describes circles in space which create a conicord with a constant vertex angle (about 3–10°). Due to this motion, the tool surface reels on the workpiece surface adhering to it only on a limited area of a shape similar to the sector of a circle. This causes considerable reduction of the pressure necessary for shaping the workpiece. However, due to the fact that material is adhering to the tool on the length equal to the radius of the material to be shaped, the displacement of material under pressure of the tool takes place mainly in a direction perpendicular to the radius, therefore in circumferential direction. This is not always advantageous since, in some cases, the required shape of the workpiece needs a radial displacement of the material. This movement is hampered in this prior art method as a result of friction between the material and tool surfaces. An object of the present invention is to decrease the total pressure exerted by the die on the shaped material and to make it possible to accommodate the direction of plastic flow of the material to the shape of the worked piece.

Plastic forming of parts, thickness of which is small in comparison with their transverse dimensions, by the method according to invention makes it possible to gain the abovementioned object due to the fact that angle of die axis deflection is not constant, but can be altered during roll flowing. These alternations are obtainable due to the fact that the resultant motion of die axis consists of two rotary motions performed with different speeds in the same or opposite directions. During each of these component motions, the die axis describes in space a conicord with constant vertex angle $2\gamma_1$. As a result of superposition of both such motions, the resultant angle of die axis deflection is altered within limits from 0 to $2\gamma_1$ and the momentary value of the deflection angle $\gamma$ is the function of angle $\alpha$, which is the momentary angle formed between the plane of deflection (determined by the axes of both dies) and an arbitrary selected immobile reference plane passing through the axis of the immobile die.

Taking into consideration the requirements of technological process, there is the possibility, by suitable change of speed ratio of both component motions, of achieving the following types of resultant motions performed with symmetry to the axes of the dies:

Circular motions, during which the die axis describes in space a conicord of vertex angle within the limits 0 to $4\gamma_1$ depending on the phase shift, in relation to each other, of both component motions being performed in the same direction with the same speed.

Spiral motions, during which the angle $\gamma$ of axis deflection alters gradually from 0 to $2\gamma_1$ together with rotation of plane of deflection, and these alterations are repeated cyclically. This kind of spiral motion is obtainable with an insignificant difference of speed of both component motions being performed in the same direction.

Oscillating motions, during which the oscillation plane rotates slowly in space. This kind of resultant die motion is obtainable when both component motions are performed in opposite directions with insignificant difference of speed.

Oscillations performed in a single plane, which are obtainable by a combination of two circular motions of the same speed but in opposite directions.

Proper alteration of speed of both component motions makes it possible to select the most suitable kind of die motion for every shape of the worked part and for every phase of technological process, thus ensuring the best condition for plastic flow of material. In addition, alteration of die deflection performed during the pressing operation causes a further decrease of the contact area of the material with the die and as a result, the further reduction of the total pressure.

An embodiment of an apparatus in accordance with the present invention is shown in drawings in two versions. In FIG. 1 the device has a mechanical drive by means of two eccentric sleeves, and in FIG. 2 the device has a hydraulic drive.

In the embodiment shown in FIG. 1, the movable die 1 is mounted in housing 2, the axis of which may be deflected from a vertical position by some angle due to the spherical bearing of housing 2 in plunger 3. Plunger 3 is mounted in cylinder 4 for relative vertical movement so that the die 1, independent of any oscillating motions, may approach the immovable die 5. The housing 2 of die 1 is terminated by a flanged element 8 which enters into an annular slot in eccentric sleeve 6. The sleeve 6 is located inside another eccentric sleeve 7. Both eccentric sleeves 6 and 7 may rotate with different speeds. As a result of the simultaneous rotation of both eccentric elements 6 and 7, the pin of die housing 2 is shifted in a direction transverse in relation to the press axis, and that causes the above-described oscillations of the axis of die 1 around the point 0. Simultaneously the pressure of liquid filling up the space between cylinder 4 and plunger 3 and between plunger 3, housing 2 and element 8 causes the pressure of die 1 on the worked material 9 resting on the immovable die 5.

Figure 2:
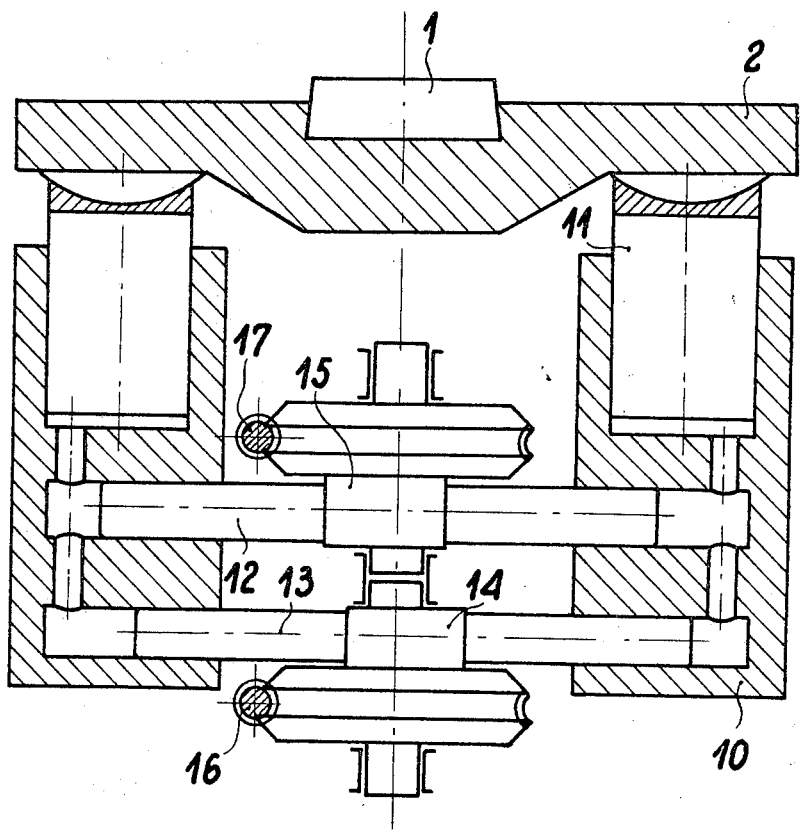

In the embodiment shown in FIG. 2, the above-described oscillations of die 1 located in housing 2, are obtained with the aid of three or four hydraulic cylinders 10 located on the circle circumference at every 120° or 90°. Each of the plungers 11 located in cylinders 10 is driven by means of two pistons 12 and 13 actuated with the aid of independently driven eccentrics 14 and 15 rotating with different speeds due to independent drive by means of worms 16 and 17.

The method of pressing according to invention finds its application in machine, electric and precision industries for cold shaping the workpieces in a form of e.g. plates, rings, disks of variable thickness and the like objects made of steel, aluminum, copper alloys and other metals and plastics.

What is claimed is:

1. A method of producing objects of variable thickness having the shape of disks, plates, rings and the like comprising the steps of forming mouldable material between two dies, effecting relative axial movement of said dies towards each other and imparting to one of said dies at least one additional motion thereby creating deflections in various directions about the axis of said one die, said additional motion being the result of combination of at least two component motions each of which, acting separately, would cause the axis of said one die to describe in space a conicord having a constant vertex angle.

2. A device for producing objects of variable thickness having the shape of disks, plates, rings and the like comprising casing means having a fixed die at one end thereof, plunger means in said casing and comprising a housing having a movable die at one end thereof in opposition to said fixed die, and means to impart to said movable die deflections in various directions about its axis, said deflections being the result of a combination of at least two component motions each of which separately would cause the die axis to describe in space a conicord having a constant vertex angle.

3. A device according to claim 2 wherein said means for imparting deflections to said movable die comprises at least two eccentric sleeves mounted between said housing and said casing means, said sleeves being selectively rotatable at the same and different speeds and in the same and opposite directions.

4. A device according to claim 2 wherein said means for imparting deflections to said movable die comprises at least three hydraulic cylinder means located about the circumference of said movable die and having plunger means in said cylinders acting against said housing to impart said deflections to said movable die and actuating means for said hydraulic cylinders controlled by two independently driven eccentrics selectively driven in the same and in opposite directions and at the same and at different speeds.

References Cited

UNITED STATES PATENTS

| | | | |
|---|---|---|---|
| 1,968,296 | 7/1934 | Hiester | 72—115 |
| 2,362,779 | 11/1944 | Stevens | 72—115 |

CHARLES W. LANHAM, Primary Examiner

M. J. KEENAN, Assistant Examiner